United States Patent Office 3,456,940
Patented July 22, 1969

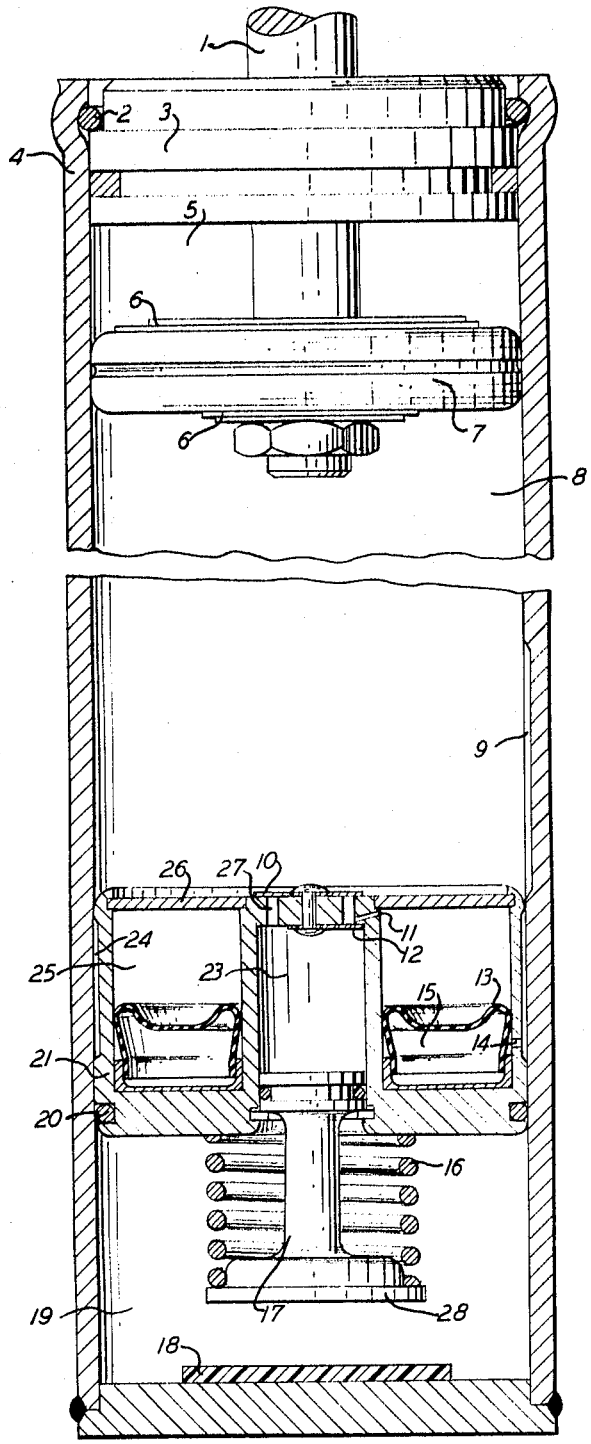

3,456,940
HYDROPNEUMATIC STRUT
Kurt P. Graef, Cologne, Germany, assignor to Ford Motor Company, Dearborn, Mich., a corporation of Delaware
Filed June 5, 1967, Ser. No. 643,616
Claims priority, application Germany, June 22, 1966,
F 49,528
Int. Cl. B60g 11/26; F16f 5/00, 13/00
U.S. Cl. 267—64                                                       12 Claims

ABSTRACT OF THE DISCLOSURE

A hydropneumatic strut for a motor vehicle suspension system having a cylindrical tube divided into jounce and rebound chambers by a ported piston. A floating compensating piston defines the lower end of the jounce chamber and seals off a pressurized gas chamber. The floating piston contains a pumping means that is constructed to pump hydraulic fluid from a reservoir within the floating piston into the jounce chamber when the vehicle is operating under loaded conditions in order to maintain the vehicle body at its design height.

Background of the invention

To improve riding qualities of motor vehicles, it is desirable to provide suspension springs that have a low spring rate. These soft springs cushion the ride but have the disadvantage of causing excessive and objectionable deflection of the vehicle body when it is loaded with passengers and luggage. In order to permit the use of soft springs in a motor vehicle, it is considered desirable to provide an auxiliary spring means with a device for adjustably loading the auxiliary means to compensate for any additional load placed on the vehicle and thereby return it to the desired or designed height.

The present invention provides a hydropneumatic strut that performs the dual function of damping jounce and rebound movement of the suspension components and also contains a pneumatic spring medium that is automatically adjustable to compensate for changes in vehicle loading. The automatic spring aspect of the present invention is achieved without the use of exterior regulating valves or compressors.

Brief summary of the invention

According to the present invention, the principal object is achieved by providing a hydropneumatic strut having a single cylindrical tube with jounce and rebound pressure chambers divided by a ported piston. A pressurized gas chamber is situated at the lower end of the tube and is separated from jounce chamber by a floating compensating piston. The gas in the chamber is the spring element of the strut.

Within the free floating compensating piston is an annular reserve hydraulic fluid chamber. The fluid is pressurized by an annular gas bag. A pump cylinder receives a pump piston within the floating piston and is urged downwardly by means of a spring. The cylinder is in communication with the reserve fluid chamber. The lower end of the pump piston is constructed to strike the bottom of the spring strut when the compensating piston moves downwardly an excess amount resulting from an increased load upon the vehicle. The pump piston is thereby urged into the interior of the pump cylinder forcing fluid therein into the jounce chamber. This action increases the amount of hydraulic fluid in the working chambers of the shock absorber and increases the internal pressure within the unit including the pressure of the gas situated beneath the compensating piston. Valve means are provided for replenishing the fluid within the pump cylinder and the reserve fluid chamber during the rebound stroke of the strut.

Brief summary of the drawing

The many objects and advantages of the present invention will become apparent upon consideration of the following detailed description and the accompanying drawing in which a hydropneumatic strut is disclosed in partial cross sectional view.

Detailed description of the invention

Referring now to the drawing for a more detailed understanding of the present invention, a hydropneumatic strut constructed in accordance with the presently preferred embodiment of this invention is illustrated. A piston rod 1 leads through a piston rod guide seal 3 that is held in position by means of a snap ring fastener 2. Within the spring strut tube 4, a working piston 7 is affixed to the lower end of the piston rod 1. The piston 7 divides the tube 4 into a rebound pressure chamber 5 and a jounce pressure chamber 8. The two working chambers 5 and 8 are interconnected by damping means comprising control orifices and valve plates 6 arranged in the working piston 7.

Adjacent to the lower end of the jounce chamber 8 there is a compensating chamber 19 containing gas under pressure which acts upon the fluid in the chambers 5 and 8 by means of a free floating compensating piston 21. The compensating chamber 19 is sealed from the jounce chamber 8 by means of O-ring seal 20 positioned between the piston 21 and the tube 4.

The compensating piston 21 is provided with an annular reserve hydraulic fluid chamber 25. Gas under pressure is stored in an annular gas chamber 15 formed by a flexible wall 13 that acts on the reserve fluid in the chamber 25. The annular reserve fluid chamber 25 is closed by a plate 26 facing the jounce chamber 8. Positioned within the annular reserve fluid chamber 25 of the compensating piston 21 is a pump cylinder 23. The pump cylinder 23 slidably receives a pump piston 17 that is urged to its lower position by means of a spring 16.

The hydraulic fluid in the pump cylinder 23 is in communication with the jounce chamber 8 by means of throttle ports 27 that are covered by a valve plate 10. The plate 10 opens during a thrust or upward stroke of the pump piston 17. The cylinder 23 is connected to the reserve fluid chamber 25 by means of a return flow channel 11 and a valve plate 12 that opens during a pull or downward stroke of the pump piston 17 to replenish cylinder 23.

The annular reserve fluid chamber 25 is also connected to the jounce chamber 8 by means of the return flow passage 14 that connects with an annular recess 24 in the outer wall of the compensating piston 21. A longitudinal recess 9 is formed in the wall of the tube 4 so that when the compensating piston 21 moves upwardly (in response to a decreasing load as will be described later) the passage 14 will be in communication with the jounce chamber 8 by means of the recesses 24 and 9.

The pump piston 17 is provided on its lower end with a spring support 28 that receives the spring 16. The spring support 28 strikes a plastic plate 18 on the lower closure member of the tube 4 when the compensating piston moves upwardly.

The strut illustrated in the drawings is intended for use in a vehicle suspension as an auxiliary unit to the conventional suspension springs. The upper end of the rod 1 is connected to a sprung component of the chassis such as a frame member. The lower end of the unit is connected to the rear axle or similar unsprung suspension part.

Operation

Upon a downward stroke of the piston rod 1, hydraulic fluid in the jounce chamber 8 is urged through the control opening in the working piston 7 into the rebound chamber 5. The orifices and valve plate 6 thereby effect a damping action. Downward movement of the piston 7 displaces fluid in the working chambers 5 and 8 and urges the compensating piston 21 to move downwardly by an amount corresponding to the volume of fluid displaced by the piston rod 1.

The movement of the compensating piston 21 pressurizes the gas in the compensating chamber 19. Since the pressure in the chamber 19 always acts upon the area of the piston rod 1, a desired suspension spring effect may be achieved by means of appropriate proportioning of the area of the piston rod 1 and the pressure in the compensating chamber 19.

Upon a downward stroke of the piston rod 1 under full vehicle load, the movement of the compensating piston 21 is so large that the pump piston 17 will strike the plastic plate 18. Further movement of the compensating piston 21 will cause the pump piston 17 to urge oil out of the pump cylinder 23 through the flow channel 27 past the valve plate 10 into the jounce chamber 8. The resultant pressure increase in the jounce and rebound chambers 8 and 5 and in the compensating gas chamber 19 produces a higher force on the piston rod 1 and, therefore, lifts the vehicle to the desired ride level.

At an upward stroke of the piston rod 1, the compensating piston 21 follows upwardly under the influence of the pressurized gas in the chamber 19 and lifts the pump piston 17 away from the plastic plate 18. The spring 16 urges the pump piston 17 out of the pump cylinder 23 back to its lower position. In this way, hydraulic fluid from the reserve fluid chamber 25 is drawn into the pump cylinder 23 through the return flow channel 11 and past the valve plate 12.

The just described pumping occurs as often as the pump piston 17 strikes against the plastic plate 18 and continues until the vehicle has reached its desired ride level again.

When the vehicle's load decreases a corresponding decrease in suspension force is desired (releveling). The compensating piston 21 moves upwardly against the reduced pressure in the jounce chamber 8 thereby uncovering the return flow recess 9. Under this condition, hydraulic fluid from the jounce chamber 8 can enter the reserve chamber 25 by way of annular recess 24 and the return flow channel 14 to replenish fluid expelled by the pumping of piston 17. The pressure in working chambers 5 and 8 as well as in the compensating gas chamber 19 is thereby reduced. This results in a net reduction in force against the area of the piston rod 1.

The foregoing description illustrates the presently preferred embodiment of this invention. Modifications and alterations may occur to those skilled in the art which will come within the scope and spirit of the invention.

I claim:

1. A hydropneumatic spring strut comprising jounce and rebound working chambers, a gas chamber, movable means sealingly separating said gas chamber from said working chambers, said means containing a reserve fluid chamber, pump means constructed to pump fluid from said reserve chamber to one of said working chambers, said pump means being constructed to engage a portion of said strut and to expel fluid drawn from said reserve chamber into said one working chamber when said strut is placed under an excess load.

2. A hydropneumatic spring strut comprising a cylindrical tube closed at one end and having a piston rod guide at its other end, a piston rod slidably disposed through said rod guide, a damping piston connected to the end of said piston rod and slidably disposed within said tube, said damping piston dividing the interior of said tube into jounce and rebound chambers, a gas chamber situated adjacent to the closed end of said tube, a floating piston separating said gas chamber from said jounce chamber, said floating piston containing a reserve fluid chamber, pump means constructed to pump fluid from said reserve chamber to said jounce chamber, said pump means being responsive to movement of said floating piston to expel fluid drawn from said reserve chamber into said jounce chamber when said floating piston is forced toward said closed end by displacement of said piston rod into said tube.

3. A hydropneumatic spring strut according to claim 2 and including:
said pump means including a pump piston slidably disposed in said floating piston, said pump piston being constructed to engage said tube.

4. A hydropneumatic spring strut according to claim 2 and including:
said pump means including a pump piston slidably disposed in a pump cylinder in said floating piston, valved passage means providing communication from said reserve fluid chamber to said cylinder.

5. A hydropneumatic spring strut according to claim 2 and including:
said pump means including a pump piston slidably disposed in a pump cylinder in said free floating piston, valved passage means providing communication from said reserve fluid chamber to said cylinder, replenishing means providing communication between said jounce chamber and said reserve fluid chamber when said free floating piston is displaced away from said closed end of said tube a preset amount.

6. A hydropneumatic spring strut according to claim 2 and including:
said pump means including a pump piston slidably disposed in a pump cylinder in said floating piston, said pump piston being spring pressed to a position extending from said floating piston and constructed to engage said closed end of said tube, valved passage means providing communication from said reserve fluid chamber to said cylinder.

7. A hydropneumatic spring strut according to claim 2 and including:
said reserve fluid chamber being annular in shape and surrounding said pump means.

8. A hydropneumatic spring strut according to claim 2 and including:
said reserve fluid chamber being annular in shape and surrounding said pump means, said pump means including a pump piston slidably disposed in a pump cylinder in said free floating piston.

9. A hydropneumatic spring strut according to claim 2 and including:
said reserve fluid chamber being annular in shape and surrounding said pump means, pressure means constructed to pressurize the fluid in said reserve chamber, said pressure means comprising an annular flexible wall member disposed in said reserve fluid chamber.

10. A hydropneumatic spring strut according to claim 2 and including:
replenishing means providing communication between said jounce chamber and said reserve fluid chamber when said floating piston is displaced away from said closed end a preset amount.

11. A hydropneumatic spring strut according to claim 2 and including:
replenishing means providing communication between said jounce chamber and said reserve fluid chamber when said floating piston is displaced away from said closed end a preset amount, said replenishing means comprising a fluid passage in the wall of said tube and fluid inlet means in the wall of said reserve chamber that are constructed to be in registry for the flow of fluid from said jounce chamber to said reserve fluid chamber when said floating piston is in said displaced position.

12. A hydropneumatic spring strut according to claim 2 and including:

said damping piston having fluid flow control means therein, said reserve fluid chamber being annular in shape and surrounding said pump means, pressure means constructed to pressurize the fluid in said reserve chamber, said pressure means comprising an annular flexible wall member disposed in said reserve fluid chamber, said pump means including a pump piston slidably disposed in a pump cylinder in said floating piston, said pump piston being spring pressed to a position extending from said floating piston and constructed to engage said closed end of said tube, valved passage means providing communication from said reserve fluid chamber to said cylinder, replenishing means providing communiaction between said jounce chamber and said reserve fluid chamber when said floating piston is displaced away from said closed end a preset amount, said replenishing means comprising a fluid passage in the wall of said tube and fluid inlet means in the wall of said reserve chamber that are constructed to be in registry for the flow of fluid from said jounce chamber to said reserve fluid chamber when said floating piston is in said displaced position.

References Cited
UNITED STATES PATENTS

| | | | |
|---|---|---|---|
| 2,095,112 | 10/1937 | Wallace | 267—64 |
| 2,174,312 | 9/1939 | Cleveland | 267—64 |
| 3,164,381 | 1/1965 | Tuczek | 267—64 |

ARTHUR L. LA POINT, Primary Examiner